United States Patent [19]
Neale, Sr.

[11] 3,842,191
[45] Oct. 15, 1974

[54] INSULATED WIRE SPLICE

[75] Inventor: Dory J. Neale, Sr., St. Petersburg, Fla.

[73] Assignee: The National Telephone Supply Company, Cleveland, Ohio

[22] Filed: Dec. 17, 1973

[21] Appl. No.: 425,508

[52] U.S. Cl............ 174/88 R, 174/84 C, 339/97 C, 339/99 R
[51] Int. Cl............................................. H02g 15/08
[58] Field of Search...... 174/84 C, 84 S, 84 R, 88 R, 174/94 R, 94 S, 88 S; 339/97 C, 98, 99 R

[56] References Cited
UNITED STATES PATENTS

| | | | |
|---|---|---|---|
| 3,041,575 | 6/1962 | Schneider | 339/99 R |
| 3,745,228 | 7/1973 | Vogt | 339/98 X |
| 3,786,173 | 1/1974 | Vogt | 174/88 S |

*Primary Examiner*—Darrell L. Clay
*Attorney, Agent, or Firm*—Fishburn, Gold & Litman

[57] ABSTRACT

A device for splicing insulated wires such as drop wires comprised of a housing for containing the ends of two insulated wire lengths or sections with the housing adapted to receive a contact member with the ends of said sections extending over and around portions of the contact member and forming a reverse bend. The splice accommodates a two conductor splice. The contact member has a non-conductor portion to separate the conductors of a wire and a plurality of teeth which penetrate the insulation and engage conductors in the wires being spliced and effect electrical continuity between the conductors. A closure member is placed in the housing over the wires and the contact member with force being applied to the closure member to cause the teeth to penetrate the insulation and make the connection. Means are provided on the housing to hold the closure member in engagement with the wires to maintain the clamped electrical engaged condition of the wires and the assembly. A viscous pressure flowable insulating material is in the housing and flows under the clamping pressure to fill the voids and surround the splice forming a substantially waterproof structure excluding moisture and air for a long life corrosion resistant splice.

8 Claims, 4 Drawing Figures

PATENTED OCT 15 1974 3,842,191
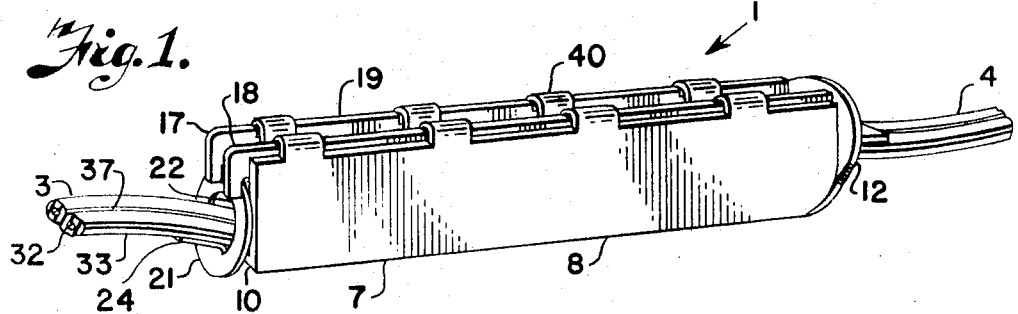
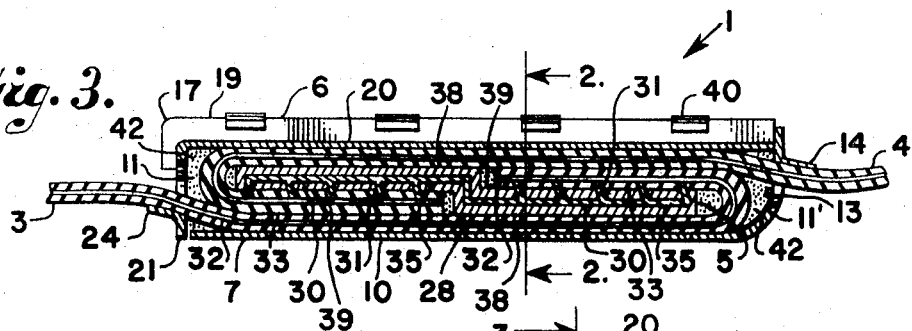
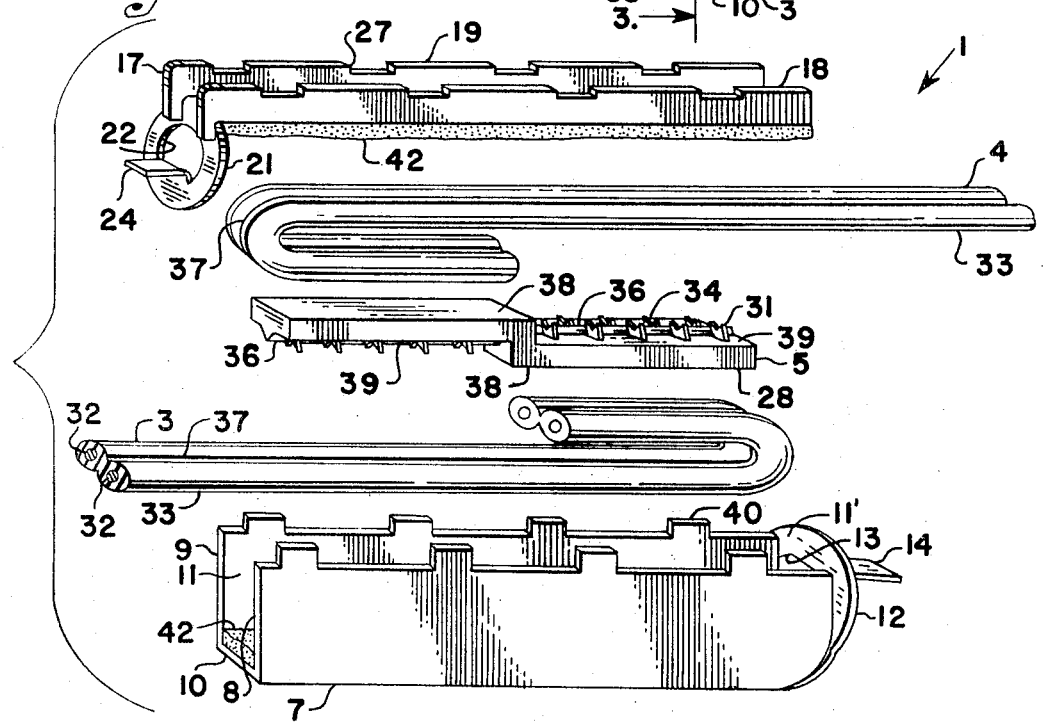

INSULATED WIRE SPLICE

Drop wires are generally comprised of two insulated conductors in side by side relation and are used in the telephone industry to extend between a building and the telephone lines. Such wires are generally long and subjected to tensile loading under their own weight, ice, wind, etc. When it is necessary to splice drop wires the splice must be such as to withstand the tensile loading and the weather conditions it is exposed to so as to maintain good electrical continuity. Such splices are made in the field whereby a device for splicing the drop wires preferably is adapted for assembly in the field with a minimum of equipment.

The principal objects of the present invention are: to provide an insulated wire splicing device using a mechanical type splice to effect electrical connection between two wire portions; to provide such a splicing device which provides a splice that will withstand high tensile loads in the spliced area; to provide such a splicing device with a housing and a closure member which are adapted to hold the wires in engagement with the mechanical splice effecting means with the housing providing strength at the splice area; to provide such a splicing device with a contact member having a plurality of insulation penetrating teeth which effect electrical contact with the conductor in the wires to be spliced upon application of force to the wires and the contact members in the housing; to provide such a splicing device wherein said cable is wrapped around an end of the contact member in a U-shape with each cable extending from an opposite end of the housing and to provide such a splicing device which is well adapted for its intended use, easy to use, compact in construction, inexpensive to manufacture, and durable.

Other objects and advantages of the present invention will become apparent from the following description taken in connection with the accompanying drawings wherein are set forth by way of illustration and example certain embodiments of this invention.

FIG. 1 is a perspective view of a splicing device used in splicing two wires.

FIG. 2 is a transverse sectional view of the splicing device taken along the line 2—2, FIG. 3 to show structural details of a contact member and the wires.

FIG. 3 is a sectional view of the splicing device taken along the line 3—3, FIG. 2, to show structural details of the contact member and the wires.

FIG. 4 is an exploded perspective view of the splicing device which effects the electrical contact between the cables.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

The reference numeral 1 designates generally a wire splicing device which is adapted to effect electrical contact splicing between a pair of wires 3 and 4 by having the conductors in the wires in electrical contact with a contact member or wire anchor and connector bar 5. The anchor member 5 and the wires are enclosed in a housing 6 with the housing 6 maintaining clamping engagement on the wires and the contact member and electrical contact therebetween. The wires are each wrapped around a respective end of the contact member to form a reverse bend with free ends of the wires 3 and 4 extending in opposite directions from the housing providing a splice which is adapted to withstand high tensile loading. The device 1 is well adapted for splicing drop wires which are used by the telephone industry and extend between a building and telephone lines. Drop wires are generally comprised of a pair of laterally spaced conductors surrounded by insulation and in use are subjected to tensile loading.

In the illustrated structure the housing 6 includes an elongate body member 7 which is shown as channel shaped having spaced apart upstanding side walls 8 and 9 with a floor or web 10 extending therebetween and forming the U-shape or channel-shape. Preferably the body 7 has opposed open ends 11 and 11' with the end 11' having a tongue member 12 integral with the body 7 and extending therefrom and having an opening 13 therethrough. The tongue 12 preferably extends from the web 10 and is bent upwardly in the direction of the walls 8 and 9 adjacent to the ends thereof and partially closes the end 11'. It is to be noted that the tongue 12 can be secured to the ends of the walls 8 and 9 to prevent bending of same. The opening 13 is positioned adjacent to the free edges of the walls 8 and 9 and is suitably formed whereby the material struck out to form the opening 13 forms an ear 14 extending outwardly from the tongue 12 with the ear 14 being positioned adjacent to the top edge of the opening 13 for a purpose to be later described.

Preferably the housing 6 has separable portions so as to provide access into the interior thereof and in this regard the housing 6 is provided with an elongate clamp or closure member 17 which preferably is sized and shaped to fit and move between the walls 8 and 9 and engage the wire 3 wherein the wires 3 and 4 are retained between the interior surfaces of the walls 8 and 9 the web 10 and the closure 17. As illustrated, the closure 17 is substantially the same length as the body 7 and is generally U- or channel-shaped having ribs 18 and 19 with a web portion 20 extending therebetween with the web 20 preferably being substantially parallel to the web 10 and with the ribs 18 and 19 providing increased rigidity for the closure 17. It is desirable to provide the closure 17 with a tongue 21 similar to the tongue 12. The tongue 21 is disposed generally normal to the web 20 and has an opening 22 therethrough adjacent to the free end of the tongue 21 with the opening 22 preferably being formed so as to have an ear 24 extending outwardly from the tongue 21 from a lower disposed edge of the opening 22 as viewed in FIG. 1. The ribs 18 and 19 as shown extend from the web 20 and onto the tongue 21 to provide increased rigidity at the juncture of the web 20 and tongue 21 to prevent bending of the tongue 21. The tongue 21 substantially closes the open end 11 when the splicing device 1 is assembled. The body 7 and the clamp 17 are formed preferably from a rigid and durable material such as bronze red brass, or stainless steel to provide a weather resistant and strong housing 6. Preferably each of the ribs 18 and 19 are provided with notches 27 along the length thereof for a purpose later described.

The splicing device 1 is provided with an anchor member 5 which is operable to effect the electrical contact between the wires 3 and 4. As illustrated the contact member 5 has a body portion 28 which preferably is made from an electrically insulating material and is adapted to have each of the wires 3 and 4 bent in a reverse bend or U-shape around opposite ends of the anchor member 5 with the assembly of wires and anchor member being receivable in the housing 6 with the wires extending out the ends 11 and 11' through the openings 13 and 22. The body 28 is provided with means for effecting electrical contact between the cables 3 and 4 and as illustrated, the means include electrical contact members 30 secured in the body 28 with the contact members 30 being a pair and spaced apart with each having a plurality of teeth 31 thereon and extending outwardly from the exterior of the body 28 for contact with the electrical conductors 32 which are surrounded by insulation 33 of each of the wires 3 and 4. The teeth 31 are suitably shaped for penetration of the insulation 33 and preferably have a concavely arcuate or V-shaped end 34 which is preferably sharp to easily penetrate the insulation 33 upon application of clamping force to the wires 3 and 4. The teeth 31 are electrically connected by a conductive strip 35 which preferably has the teeth 31 integral therewith and formed thereon, such as with a forging process. As illustrated, the teeth 31 are positioned in rows extending longitudinally along the contact member 5. The contact members 30 can be of any suitable conductive material such as brass or bronze. The body 28 electrically isolates the contact members 30 and the teeth 31 from the housing 6. Preferably the anchor member 5 is provided with a pair of contact members 30 spaced apart in edge to edge relation and insulated from one another by the body 28 and have a separator rib 36 therebetween. Preferably wires 3 and 4 are of two-strand type wherein the separator rib 36 contacts the respective wires 3 and 4 in a groove 37 centrally between the spaced apart strands or conductors 32. Opposed ends of the body 28 has opposed faces 38 with each having a recessed portion in opposed relation with a wire engaging surface 39 wherein the teeth 31 project from a respective surface 39 adjacent one end of the body 28 in a direction generally opposite the teeth 31 on the opposite end of the body 28. The recessed portions terminate adjacent the longitudinal center of the anchor 5 and the ribs 36 extend from the respective surface 39. Preferably the anchor 5 is adapted for manufacture by a molding process wherein the contact members 30 are molded in place with the teeth 31 preferably being inclined slightly toward the center of the anchor 5. The ends 34 of the teeth 31 can be formed before molding but it is to be noted that they can be machined after molding of the anchor 5 to control their height from respective wire engaging surfaces 39 adjacent to the ribs 36. The ends 34 can be of different heights from the surfaces 39 so as to control the amount of penetration of the insulation 33 along the length of each of the wires 3 and 4. As for example, the teeth 31 adjacent to the ends of the body 28 may have a height less than the height of the teeth 31 adjacent to the center of the body 28. It is also to be noted that the incline of the teeth 31 can be provided by bending or otherwise forming same after molding of the center member 27.

The present invention is more fully understood by a description of the operation thereof. It is to be noted that the device 1 is well adapted to splice drop wires but is also adapted for splicing other types of wire. When it is desired to splice two wires 3 and 4 together, the wire 3 is wrapped around one end of the body 28 having the end thereof positioned adjacent to the center of the body member with the wire 3 extending longitudinally along the body 28 wrapping around the free end with the insulation 33 engaging the teeth 31 and with the wire 3 being in a reverse bend. The wire 4 is wrapped around the opposite end of the body 28 having an end thereof positioned adjacent to the center of the body 28 with the insulation 33 thereon in engagement with the teeth 31 and the wire 4 being in a reverse bend and extending generally longitudinally along the body 28. The U-shape of the wire 3 opens generally toward the U-shape of the wire 4. The wire 3 has a portion thereof overlying the end of the wire 4 in engagement with the teeth 31 and the wire 4 has a portion thereof overlying the end of the cable 3 that is in engagement with the teeth 31. The wire 3 extends through the opening 13 and the wire 4 extends through the opening 22. After wrapping the wires 3 and 4 around the body 28, the anchor 5 is placed between the walls 8 and 9 wherein the wire 4 is in engagement with the inner disposed surface of the web 10. The closure member 17 is then placed between the walls 8 and 9 wherein the inner disposed surface of the web 20 is in engagement with the wire 3. The length of the anchor 5 and wires 23 and 4 in assembly is preferably less than the spacing between the tongues 12 and 21 and less than the length of the body 7. Suitable means (not shown) apply force to the closure 17 to urge the teeth 31 through the insulation 33 of the wires 3 and 4 so that the teeth 31 will engage the conductors 32 to effect the electrical connection between the wires 3 and 4. One conductor 32 of the wire 3 will be in electrical contact with one conductor 32 of the wire 4. After compressing the wires 3 and 4 between the body 7 and the closure 17, tangs 40 on the free edges of the side panels 8 and 9 are bent or otherwise formed to be received in respective notches 27 and overlie and engage the ribs 18 and 19 so as to retain the closure 17 within the body 7 and to hold the cables 3 and 4 in a compressed condition with the teeth 31 in contact with the wires 32. Interengagement between the tangs 40 and the edges defining the notches 27 prevents relative longitudinal movement between the body 7 and closure 17. Preferably the ribs 18 and 19 have a height sufficient so that same extend slightly above the top edges of the walls 8 and 9 when the device 1 is assembled to help maintain contact between the teeth 31 and the conductors 32. It is to be noted that the inner disposed surfaces of the webs 10 and 20 can each be provided with a layer of viscous pressure flowable inert insulating material 42, such as silica gel, putty, etc., to encapsulate the splice to protect same from the degrading effects of oxidation or corrosion. When the clamp 17 compresses the wires 3 and 4 the material 42 will flow into the voids between the wires 3 and 4 and the anchor 5 to provide a moisture and air resistant seal. The ears 14 and 24 provide an increased contact area between the tongues 12 and 21 so as to prevent the edges defining the openings 13 and 22 from cutting through the insulation 33. Wrapping the wires 3 and 4 around the ends of the anchor 5 provides a splice which resists separation under tension loading conditions. The splice between the wires 3 and 4 allows same to be in longitudinal alignment and is of a mechanical type requiring no soldering.

It is to be understood that while I have illustrated and described certain forms of my invention, it is not to be limited to the specific form or arrangement of parts herein described and shown.

What I claim and desire to secure by Letters Patent is:

1. An electrical wire splice comprising:
  a. a body member having spaced apart side walls and a web therebetween and having opposed ends with openings sized for receiving a wire therethrough;
  b. a clamp member disposed between said wall walls being movable toward said web;
  c. an anchor member received between said member having opposite ends adjacent the opposite ends of said body and having conductor means cooperating therewith;
  d. wire members each extending through a respective one of said body openings and reversely bent around a respective end of said anchor member with said wires electrically engaging said conductor means effecting electrical continuity therebetween;
  e. cooperating means on said body and said clamp member holding the same in clamping engagement with said wires and said anchor member and holding said wires in electrical contact with said conductor means.

2. The splice as set forth in claim 1 wherein:
  a. said wires including conductors surrounded by insulation;
  b. said anchor member being of electrically insulating material having said conductor means therein and extending longitudinally thereof, said conductor means including a plurality of insulation penetrating teeth extending from said anchor member with certain of said teeth extending from opposed surfaces of said anchor member in opposed directions and penetrating said wire insulation and contacting said conductors.

3. The splice as set forth in claim 2 wherein:
  a. said anchor member has opposed faces and has recessed portions in said opposed faces with each said recessed portion extending from a respective opposed end of said anchor member and terminating short of a longitudinal center of said anchor member, said recessed portions being in opposed relation; and
  b. certain of said teeth extending from one of said recessed portions and the remaining said teeth extending from the other said recessed portion.

4. The splice as set forth in claim 3 including:
  a. tongue members on at least one of said body member and said clamp member and positioned adjacent respective ends of said body and overlying the body openings, each of said tongue having a through aperture receiving one of said wires therethrough;
  b. an ear on each of said tongues and extending away from said body and engaged with a respective wire preventing same from contacting the edge defining said through aperture.

5. The splice as set forth in claim 4 including:
  a. a pressure flowable insulating material in said body encapsulating the electrical connection between said wires and said conductor means.

6. The splice as set forth in claim 4 wherein:
  a. said clamp member has a pair of spaced apart ribs each adjacent a respective one of said side wall; and
  b. said cooperating means includes tangs on said side walls bent over in engagement with respective one of said ribs holding said clamp member in clamping engagement with said wires and said anchor member.

7. The splice as set forth in claim 6 including:
  a. means cooperating with said body and said clamp member for limiting relative longitudinal movement therebetween, said means including notches in said ribs with each said notch receiving a respective one of said tangs therein wherein engagement between said tangs and edges defining said notches prevents said relative longitudinal movement; and wherein
  b. said body being an open top channel member.

8. The splice as set forth in claim 4 wherein:
  a. said wires each including a pair of conductors surrounded by insulation with a groove in the insulation between said conductors;
  b. said conductor means includes a pair of conductor members in side by side electrically isolated relation in said anchor member and extending longitudinally thereof, each said conductor member having a plurality of said teeth thereon, each said conductor member and respective teeth effecting electrical continuity between one conductor of each said wire, said teeth on each conductor member being in a row; and
  c. a rib on each said recessed portion positioned between the rows of teeth and received in the groove of a respective said wire.

* * * * *